United States Patent [19]

Lindsay

[11] Patent Number: 5,484,277
[45] Date of Patent: Jan. 16, 1996

[54] MANDRELESS MOLDING SYSTEM

[75] Inventor: William E. Lindsay, Mesa, Ariz.

[73] Assignee: McDonnell Douglas Corporation, Huntington Beach, Calif.

[21] Appl. No.: 456,888

[22] Filed: Dec. 26, 1989

[51] Int. Cl.⁶ .................................................. B29C 62/00
[52] U.S. Cl. ................................ 425/388; 425/DIG. 60; 249/134; 264/316
[58] Field of Search .................................. 264/101, 102, 264/313, 257, 258, 510, 511, 571, 31.6; 156/285; 425/389, 390, 128, 89, DIG. 44, DIG. 60, 388; 249/112, 114.1, 134

[56] References Cited

U.S. PATENT DOCUMENTS

| | | | |
|---|---|---|---|
| 2,593,714 | 4/1952 | Robinson | 244/119 |
| 2,781,554 | 2/1957 | Robinson | 264/511 |
| 3,330,550 | 7/1967 | Brownlee | 249/65 |
| 3,610,563 | 10/1971 | Allen et al. | 249/65 |
| 3,641,230 | 2/1972 | Jenks | 264/152 |
| 3,642,975 | 2/1972 | Duggins et al. | 264/316 |
| 3,728,777 | 4/1973 | Crowe | 264/511 |
| 3,871,941 | 3/1975 | Wasko | 264/316 |
| 3,937,781 | 2/1976 | Allen | 264/314 |
| 3,962,393 | 6/1976 | Blad | 264/314 |
| 3,964,958 | 6/1976 | Johnston | 156/285 |
| 4,132,755 | 1/1979 | Johnson | 264/258 |
| 4,202,856 | 5/1980 | Frikken | 264/258 |
| 4,267,142 | 5/1981 | Lankheet | 264/511 |
| 4,270,964 | 6/1981 | Flaskett | 264/510 |
| 4,512,835 | 4/1985 | Gardiner | 264/258 |
| 4,562,033 | 12/1985 | Johnson | 264/510 |
| 4,780,262 | 10/1988 | VonVolkli | 264/512 |
| 4,816,106 | 3/1989 | Turris | 264/510 |
| 4,853,172 | 8/1989 | Jacaruso | 264/257 |
| 4,915,896 | 4/1990 | Rachal | 264/258 |

FOREIGN PATENT DOCUMENTS

| 2202486 | 9/1988 | United Kingdom | 264/511 |
|---|---|---|---|

*Primary Examiner*—Ngoclan T. Mai
*Attorney, Agent, or Firm*—Donald E. Stout; John P. Scholl; Roger C. Turner

[57] ABSTRACT

A tool for fabricating fiber reinforced resin matrix composite structures having molded outside surfaces with intermittent molded inside surfaces e.g. aircraft skin with internal stiffeners. The tool employs a hybrid vacuum bag with soft portions in combination with rigid portions to produce the internal stiffeners. The stiffeners are supported and shaped during curing by pressurized elastomeric tubes, in lieu of mandrels, which can be easily removed when collapsed. The stiffeners and skin can be made from wet lay-ups or prepregs, formed in place or preformed, and in combinations where one part is precured or both parts are co-cured.

5 Claims, 3 Drawing Sheets

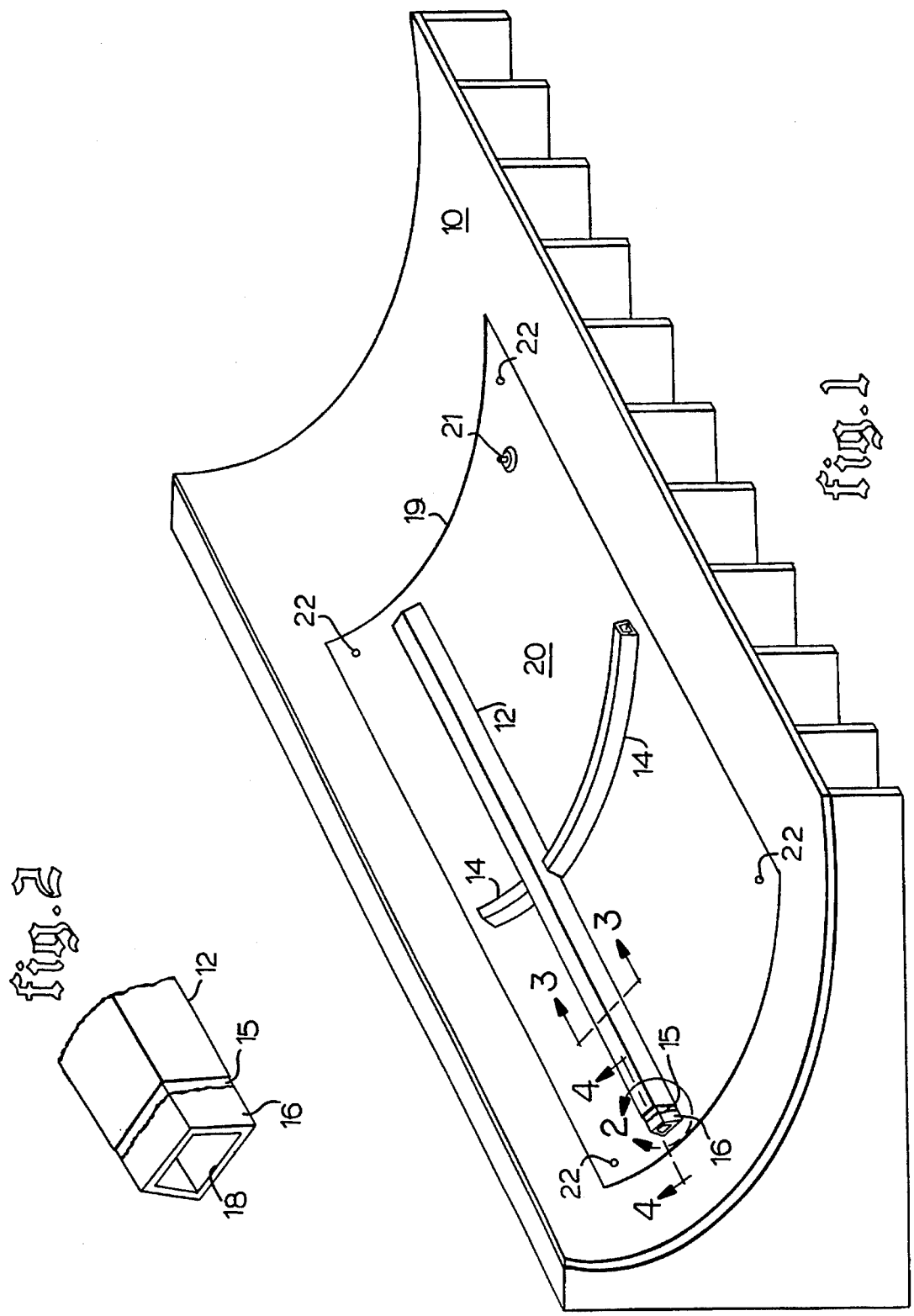

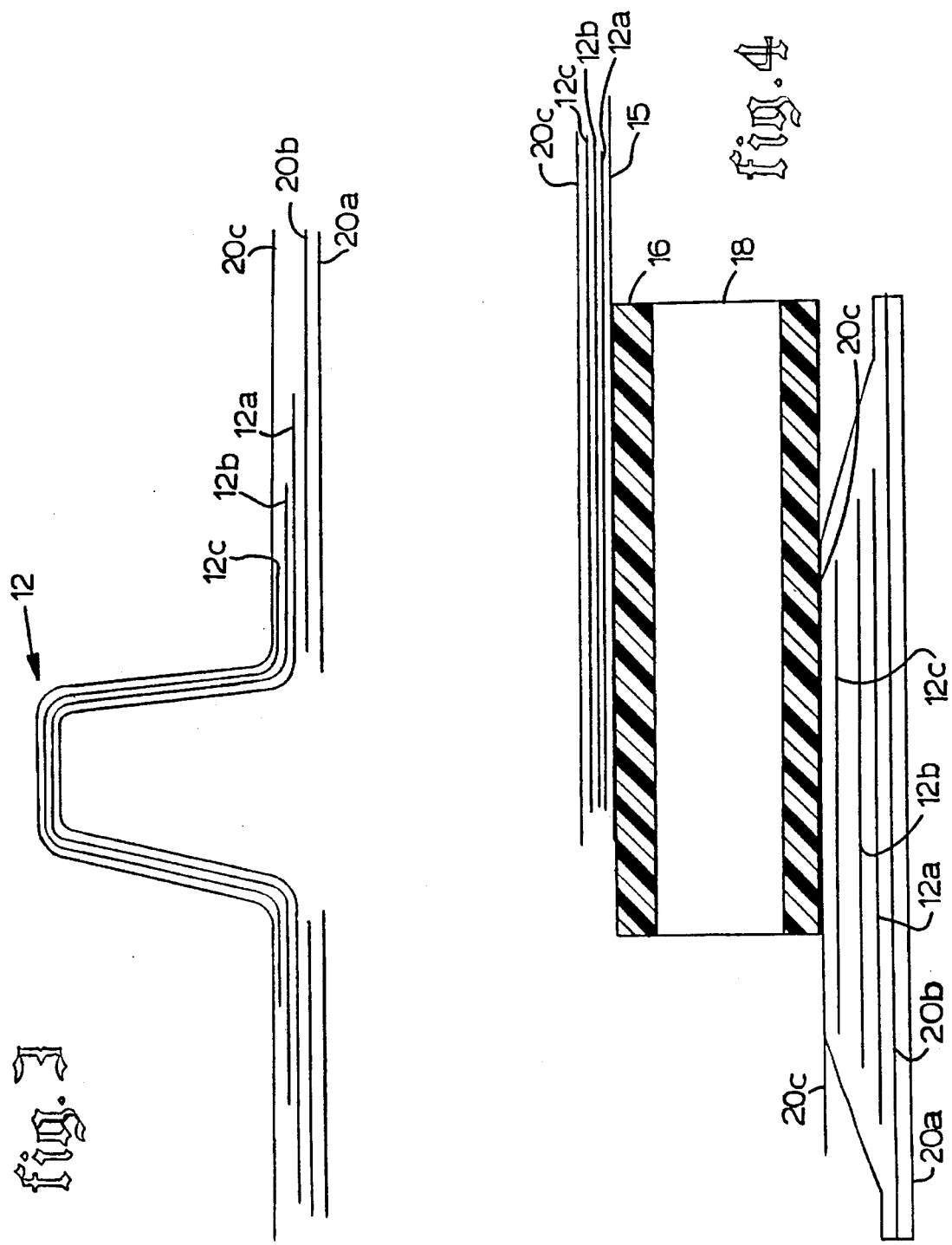

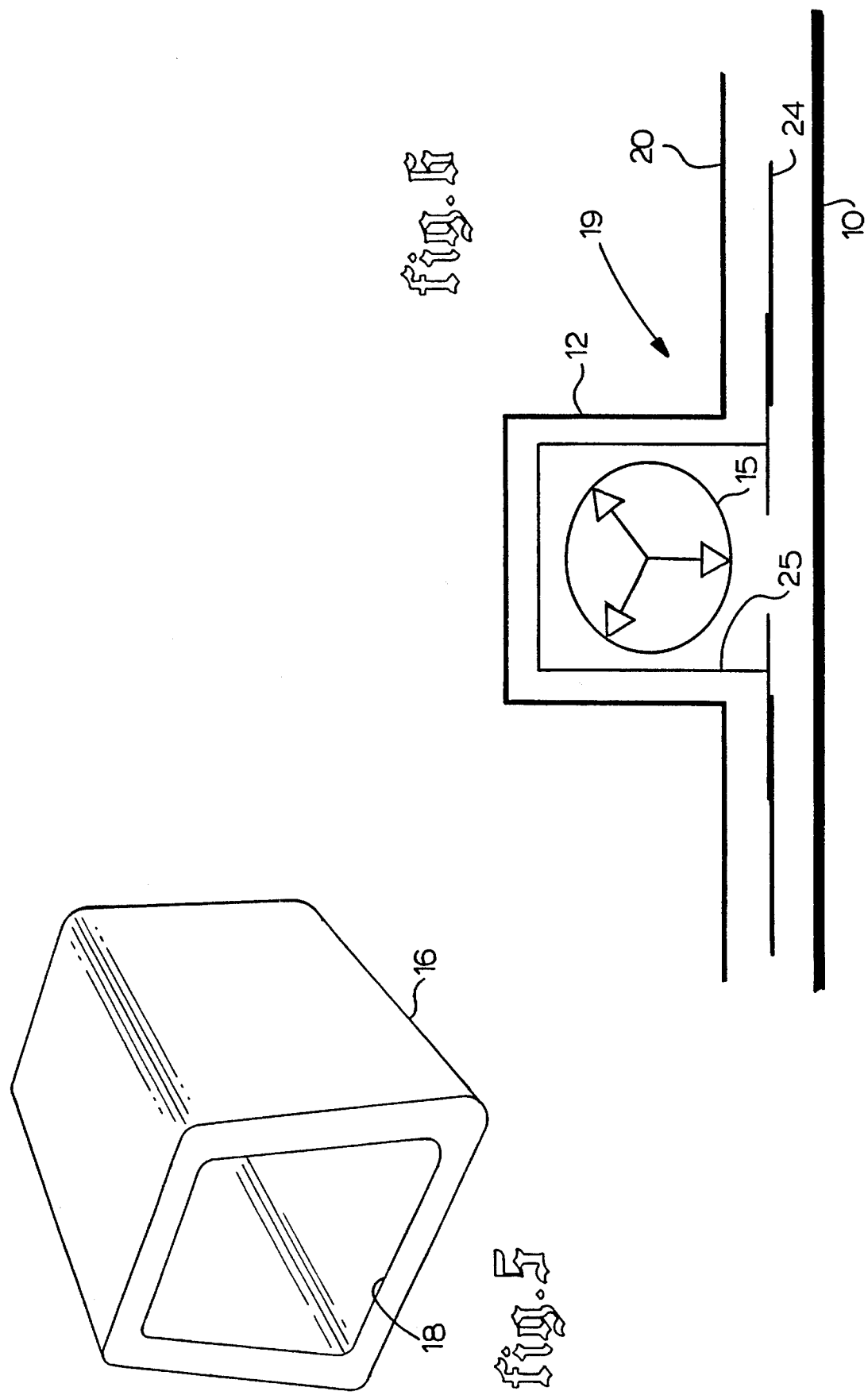

MANDRELESS MOLDING SYSTEM

BACKGROUND OF THE INVENTION

This invention relates to the field of fabricating articles from a plurality of plies of fiber reinforced resin matrix composite material. More particularly, the invention relates to a mandreless molding system to produce components which have molded outside surfaces with intermittent molded internal surfaces such as an aircraft skin with internal stiffeners typically known as longerons, stringers, frames, and struts.

The use of fiber reinforced resin matrix composite materials in the fabrication of aircraft components is becoming increasingly more popular and therefore more important. For instance the F-15 fighter, currently the premier fighter of the U.S. Air Force, developed in the early 1970's had only four percent of its structural weight made up of composites. Comparatively, the advanced tactical fighter, currently in competition, has approximately fifty percent; the B-2 bomber is estimated to have 80 percent of the B-2 structure made from composites.

Composites, as applied to this invention, are made of two essential ingredients: high-strengthened fibers that have been woven into tape or broadcloth and resins that bind the fabric into a rigid and light-weight matrix. Carbon, graphite, and glass are the most typical fibers used. Epoxy, polyester, and phenolics are the most common polymers used. Typically, in producing parts, the tape or broadcloth, which is impregnated with the polymer and known as a prepreg, is laid down onto a mold that represents the shape and contour of the outer skin of the aircraft or helicopter. These stiffeners, longerons and stringers, are typically made from prepreg material preformed into an efficient structural cross section, e.g. T, Z, C, and hat sections which all have a substantial amount of open space. These stiffeners are then arranged on the above-noted skin along dominate load directions both longitudinally and transversely. Since these stiffener members are required to strain with the skin or shell member in order to carry a portion of the load they must be bonded to the skin. This is usually accomplished by co-curing the stiffener along with the skin. However, mandrels must be placed inside these structural stiffeners in order to shape and prevent their collapse during curing in an autoclave at a temperature of about 350° and a pressure of 100 pounds per square inch.

By aligning the stiffeners along dominant load directions a more efficient structural arrangement is achieved. For this reason, it is common practice to run the stiffeners in a fuselage generally along the length of the structure. As previously indicated, the stiffeners themselves must be supported at intervals by transverse stiffening members to prevent their failure by column buckling. This intersection of the longitudinal and transverse stiffeners requires an integral joint even though the longerons generally run continuously and are butted by the transverse members. Structural requirements of these intersecting stiffener joints make for very difficult and sometimes impossible removal of the above-noted mandrels which are trapped. Sometimes it is necessary to use "flyaway" mandrels because they cannot be removed.

In today's typical art, the above-noted prepreg skin with the prepreg stiffeners in place, all supported by the mold and mandrels, as required, is covered by a vacuum bag and a vacuum drawn between the bag and the mold to compress the parts before they are placed in the autoclave. These are generally throw away vacuum bags. Throw away vacuum bags are both costly and labor intensive as it takes a long time to bag a structural assembly.

It is an object of the present invention to produce a tool which will allow for the fabrication of fiber reinforced resin matrix composite aircraft and helicopter structures without requiring the use of mandrels. It is a further object of this invention to integrally mold mating surfaces on the inside as well as the outside surface of the component. It is yet another object of the invention to reduce the cost of the tooling by elimination of mandrels and disposable bagging materials and, further, substantially reduce the manpower required to both vacuum bag and remove the mandrels from a structural part. The final object of the invention is to be able to use several different cross section stiffeners without changing the tooling.

SUMMARY OF THE INVENTION

In summary, the present invention provides a tool which enables a mandreless mold system for the production of aircraft type stress skins with integral stiffeners by providing a reusable, hybrid vacuum bag having rigid cavities oriented away from the primary tool or mold which can be male or female in general shape. The rigid cavities are shaped to accommodate the stiffeners and are sealed to the vacuum bag so as to form an integral rigid portion of the vacuum bag. The rigid cavity must have at least one aperture and preferably two opposing apertures at opposite ends of the rigid cavity so as to accommodate an elastomeric tube extending through and protruding from the two apertures in the cavity. Means are provided to seal the elastomeric tube against the inside of the rigid cavity at the aperture while providing a vent through the sealing means so that when a vacuum is drawn between the vacuum bag and the mold or primary tool the elastomeric tube inside the cavity is vented to the atmosphere as opposed to the vacuum. The preferred sealing means is an elastomeric wedge shaped to conform to the open ends or apertures of the rigid portion of the hybrid vacuum bag so that when it is inserted inside the elastomeric tube and pressed into the rigid opening it forms a seal. The wedge has a through hole to allow air to enter the inside of the elastomeric tube.

In the event that the stiffener portion of the structure is such that only one opening or aperture can be accommodated in the rigid cavity it is necessary to close off the elastomeric tube at the blind end of the cavity. This may be accomplished by tying a knot in the tube and turning the tube inside out so that the knot is inside the tube.

The method of fabricating an article from a plurality of plies of fiber reinforced resin matrix composite materials incorporating integral stiffeners with the mandreless molding system is as follows: the composite prepreg stiffener sections are usually preformed and laid up on the inside portion of the rigid portion of the vacuum bag and the lay-up debulked. The elastomeric tubes are then installed in the rigid cavity portions of the vacuum bag and the sealing wedges are forced into place to hold the elastomeric tubes and at the same time seal them to the rigid portion of the cavity. The elastomeric tubes extend through and protrude from the sealing wedges. The skin plies are then laid up on the primary mold and the hybrid bag installed on the mold. Index pins are provided to properly orient the hybrid bag to the primary mold or tool. A vacuum is then drawn on the bag, any vacuum leaks are remedied, and the part is ready for cure in either an oven or autoclave. After completion of the curing, the wedges which provided the sealing means are removed and a vacuum is drawn on the elastomeric tubes to collapse them for easy removal. After removal of the elastomeric tubes and the hybrid bag the completed structural part is removed from the primary tool.

BRIEF DESCRIPTION OF THE DRAWINGS

In the drawings, like element designations refer to like parts throughout, and:

FIG. 1 is a pictorial view showing the primary tool or mold with the hybrid vacuum bag in place and a seal at the end of the rigid portion.

FIG. 2 is an enlarged isometric view of the sealing means at the opening in the rigid portion of the vacuum bag.

FIG. 3 is a section view cut at 3—3 of FIG. 1 showing a section through both the flexible and rigid portions of the vacuum bag with one line representing one layer of material.

FIG. 4 is a section cut longitudinally through a portion of the rigid cavity portion of the vacuum bag cut at 4—4 of FIG. 1.

FIG. 5 is a pictorial view of the preferred sealing means.

FIG. 6 is a diagrammatic view of the section through the rigid portion of the vacuum bag showing the prepregs in place and the elastomeric tube inflated.

BEST MODE FOR CARRYING OUT THE INVENTION

Anyone familiar with aircraft and helicopters will readily recognize that the structure and apparatus shown in the drawings is abbreviated as the actual structure is far more extensive. The apparatus for an abbreviated structure was chosen because it is more easily understood and was in fact the apparatus used to develop the tooling and method. However, the apparatus shown is constructed according to the invention and constitutes the best modes of the apparatus and the process of the invention currently known to the applicant.

FIG. 1 shows a complete mandreless molding system with the primary tool or mold shown as 10. While the primary tool is shown with a smooth, curved outside surface, the primary tool regularly accommodates indentations, bulges or shape changes into the primary tool, all which can be accommodated by the vacuum bag and the technique is well known in the art. Shown on top of the primary tool 10 is the hybrid vacuum bag 19 with the rigidized cavity portion shown as portions forming a longeron at 12 and a frame at 14, both of which are stiffeners. An elastomeric tube 15 is shown extending from the rigidized portion forming the longeron 12. Inside the elastomeric tube 15 is a sealing wedge 16 having a through hole or aperture 18. The end of the rigidized portion of the vacuum tube forming the longeron along with the wedge and elastomeric tube is shown in an enlarged view in FIG. 2. The rigidized portions 12 and 14 are attached to the vacuum bag 19 which is shown with the vacuum fitting at 21 and index pins at 22 which simply orient the vacuum bag 19 in the proper location on the old or primary tool 10. There must be an effective seal between the rigidized portions 12 and 14 and the soft caul portion 20 of the vacuum bag 19.

FIGS. 3 and 4 show a cross section through the rigidized portion of the vacuum bag which produces the longeron 12 or alternatively the stringer 14 as they are both similar, varying in size and shape so as to form the required stiffener. These two section views show one method of forming the rigidized cavity portion 12 or 14 and how it attaches to the soft caul portion 20 of the vacuum bag 19. In these figures one line shows one layer either rubber or the reinforcing cloth, as the case may be. Sheets 20a and 20b are two sheets of rubber that form a portion of the vacuum bag 20. This is followed by three layers of reinforcing cloth which has been prepreged with resin and shown as 12a, 12b, and 12c with a final layer of the rubber vacuum bag at 20c which is shown laid over the top including the rigidized portion. The space between the layers is shown simply to illustrate how they are laid up before curing and, in fact, there is no space between them as they lay contiguous to each other. The drop-off in the layers i.e. where one layer is shorter than the next layer, is done simply to provide a smooth transition between the layers.

FIG. 4 shows a longitudinal cross section through the rigid portion forming the longeron and shows the same layers as shown in FIG. 3 except that the cut is 90° to the cut of FIG. 3. Also shown in FIG. 4 is the sealing wedge 16 with the through hole 18.

FIG. 5 is a perspective view of the sealing wedge 16. The through hole 18 or aperture may be of any suitable shape. The wedge needs to seal to the inside of the elastomeric tube 15 while also forcing or enabling a seal between the outside of the tube 15 and the inside of the rigidized portion at the holes or apertures in the rigidized portions.

FIG. 6 is a diagrammatic view of a section through the rigid portion of the vacuum bag showing the product being formed as opposed to the fabrication of the tool which was shown in FIGS. 3 and 4. In this figure the primary tool or mold is shown at 10 followed by several layers of essentially the reinforcing cloth shown as 24 along with the stiffener 25 which could be either the longeron or the stringer. The stiffener is usually formed out of preformed prepreg parts and in this particular case could be a hat section as shown at 25 or 25 could be composed of several different elements e.g. a T-section in combination with an L-section and a J-section to form the hat section. Of course, the stiffener could be anyone of those sections alone, as required. The elastomeric tube 15 is shown partially inflated and the arrows represent gas pressure which is provided by the vent hole 18. Of course, when the tube 15 is totally inflated it conforms to the configuration of the stiffener 25 and, depending on the shape of the stiffener, may be two tubes. For instance, if the stiffener is a T-section two elastomeric tubes or one elastomeric tube and a mandrel could be used. The pressure in the elastomeric tube 15 is provided either by atmospheric air, since a vacuum is drawn between the vacuum bag 19 and primary tool 10, or an independent source of gas pressure.

The method of the invention is carried out as follows. The composite prepreg stiffener sections, herein shown as preformed hat sections 25, are laid up on the inside portion of the rigid portion of the vacuum bag which is represented by 12 in the illustration for the longeron stiffener and 14 for the stringer. The lay-up is then debulked and the elastomeric tubes 15 are installed in the rigid cavity portions of the vacuum bag 19. The sealing wedges 16 are forced into place to hold the elastomeric tubes 15 and to seal them to the rigid portion of the cavity 12 or 14. The elastomeric tubes 15 extend through and protrude from and around the sealing wedge 16 which is installed inside of the rigid portion 12 of the hybrid bag. The inside of the elastomeric tube is vented via hole 18 to the atmosphere, whatever that may be, which in an oven is typically atmospheric or approximately 14 PSI and if used in an autoclave the pressure is in the ranges up to 200 PSI. The skin plies, which are made from preimpregnated reinforcing cloth, are shown as 24 and are laid up on the primary mold and debulked. The hybrid bag 19 is then installed on the mold so that the index holes in the bag are oriented to the index pins 22 in the primary tool 10. A vacuum is then drawn on the bag and any vacuum leaks repaired. The part is then ready for cure in either an oven or an autoclave. Upon completion of the curing cycle the wedges 16 are removed and a vacuum may be drawn on the elastomeric tubes 15 to collapse them for easy removal. After removal of the elastomeric tubes 15 and the hybrid bag 19 the completed structural part is removed from the primary tool 10 as a completed part.

Although the method has been described using preformed prepreg details (stiffeners) and prepreg skins the method and apparatus is applicable to wet lay-ups and resin transfer molding. Further, it may be used for the bonding of precured details (stiffeners) to precured skin or for co-bonding precured details to uncured skins or co-bonding uncured details to precured skins.

Although the preferred embodiments of the invention have been illustrated and described, and it is intended to be understood by those skilled in the art that various modifications and omissions in form and detail may be made without departing from the spirit and scope of the invention as defined by the following claims.

What is claimed is:

1. A hybrid vacuum bag for forming a fiber reinforced resin matrix composite structure with stiffeners between said hybrid vacuum bag and a primary tool, comprising:

an elastomeric sheet with means to attach a vacuum line;

at least one rigid cavity oriented away from said primary tool, having an inside and an outside, inserted in and sealed to said elastomeric sheet and said cavity having at least one aperture;

an elastomeric tube, having an inside and an outside surface, inserted in each of said rigid cavities and extending from each of said at least one aperture;

means to seal said outside of said elastomeric tube against the inside of said rigid cavity at said at least one aperture; and means to provide an open vent passageway from said inside of said elastomeric tube.

2. The hybrid vacuum bag of claim 1 wherein said at least one rigid cavity is itself made from fiber reinforced resin matrix composite material and said elastomeric sheet is at least two sheets co-cured with said matrix composite material so as to form a seal between said rigid cavity and said elastomeric sheet.

3. The hybrid vacuum bag of claim 1 wherein said means to seal said outside of said elastomeric tube against the inside of said rigid cavity is a sealing wedge shaped to fit said aperture in said rigid cavity and having a through opening so as to provide said vent from the inside of said tube.

4. The hybrid vacuum bag of claim 3 wherein said an elastomeric tube is two elastomeric tubes each of said two elastomeric tubes are sealed at one end and open at one end and arranged so that said sealed ends of said elastomeric tubes abut inside said stiffener and said open ends protrude from said stiffener to support said stiffener.

5. The hybrid vacuum bag of claim 3 wherein said an elastomeric tube is an elastomeric tube sealed at one end in combination with at least one mandrel arranged so that said sealed end abuts said mandrel inside said stiffener and said open end of said elastomeric tube protrudes from said stiffener to support said stiffener.

\* \* \* \* \*